Figure 1:
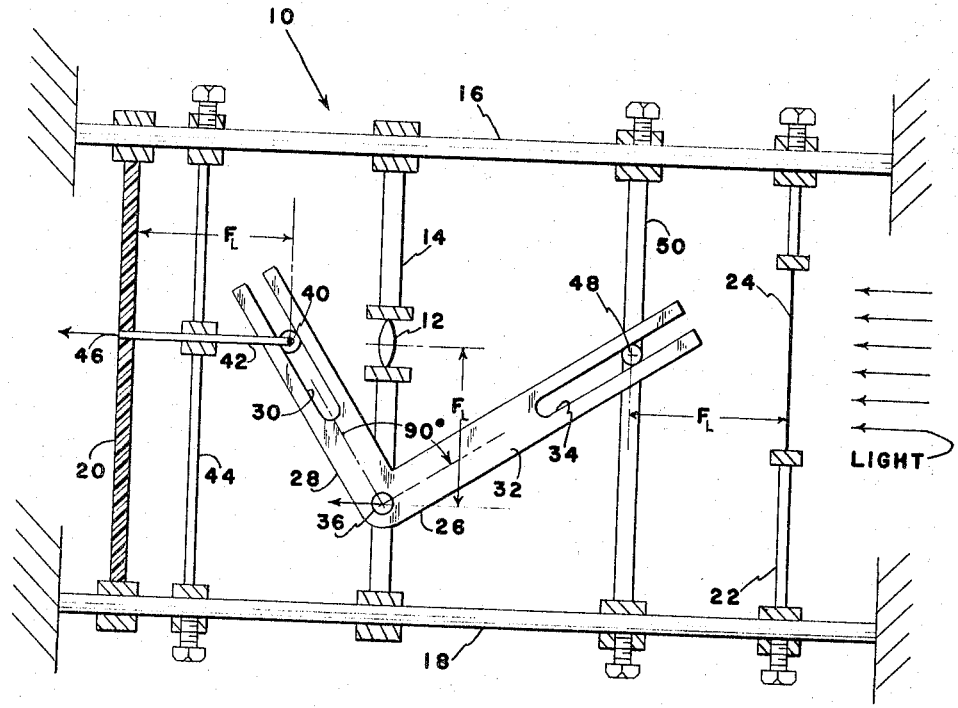

May 2, 1967  B. M. MADIGAN  3,317,269

AUTOFOCUS LINKAGE

Original Filed June 7, 1962

INVENTOR
BASIL M. MADIGAN
BY
A.H. Oldham
ATTORNEY

United States Patent Office 3,317,269
Patented May 2, 1967

3,317,269
AUTOFOCUS LINKAGE
Basil M. Madigan, Wadsworth, Ohio, assignor to Goodyear Aerospace Corporation, Akron, Ohio, a corporation of Delaware
Original application June 7, 1962, Ser. No. 200,729, now Patent No. 3,208,341, dated Sept. 28, 1965. Divided and this application Aug. 3, 1965, Ser. No. 476,958
2 Claims. (Cl. 352—140)

This invention relates to an autofocus linkage and is a divisional application of a parent application on a "Stereo Viewer," Ser. No. 200,729, filed June 7, 1962, now Patent No. 3,208,341. The invention relates to a unique linkage to insure automatic focus of projected light images regardless of lens displacement, or utilization of various lenses in the linkage system.

Heretofore, it has been known that there have been many and various types of autofocus linkages. However, generally these linkages or systems are only adapted for specific lens combinations. In other words, they are not readily adptable to various lens combinations with the same system, nor are they readily adjustable to achieve focus automatically for any and all size enlargements or reductions.

It is the general object of the invention to avoid and overcome the foregoing and other difficulties of and objections to prior art practices by the provisions of a relatively inexpensive, simplified and adjustable autofocus linkage readily adaptable to various lens combinations.

A further object of the invention is to provide an autofocus linkage where the image and object distances from the lens may be varied with autofocus still maintained.

The aforesaid objects of the invention and other objects which will become apparent as the description proceeds are achieved by providing an autofocus linkage comprising a bell crank having a 90° included angle and a longitudinal slot at each end thereof, means pivotally connecting the apex of the bell crank to a lens at a point offset from the axis of the lens a distance equal to the focal length of the lens, means limiting the movement of the pivot means to the plane parallel to the axis of the lens, a fixed guide pin spaced from the film towards the lens a distance equal to the focal length of the lens, the fixed pin being positioned in the plane of the axis of the lens and extending normal to said axis and parallel to the pivot means, one of the slotted end portions of the crank being in an engagement with the pin, a movable guide pin spaced from the lens a distance equal to the focal length of the lens, the pin being positioned in the plane of the axis of the lens and extending normal to the axis and parallel to the pivot means, the other of the slotted end portions of the crank being in engagement with the movable pin, and means limiting the movement of the movable guide pin to the plane of the axis of the lens.

Figure 2:
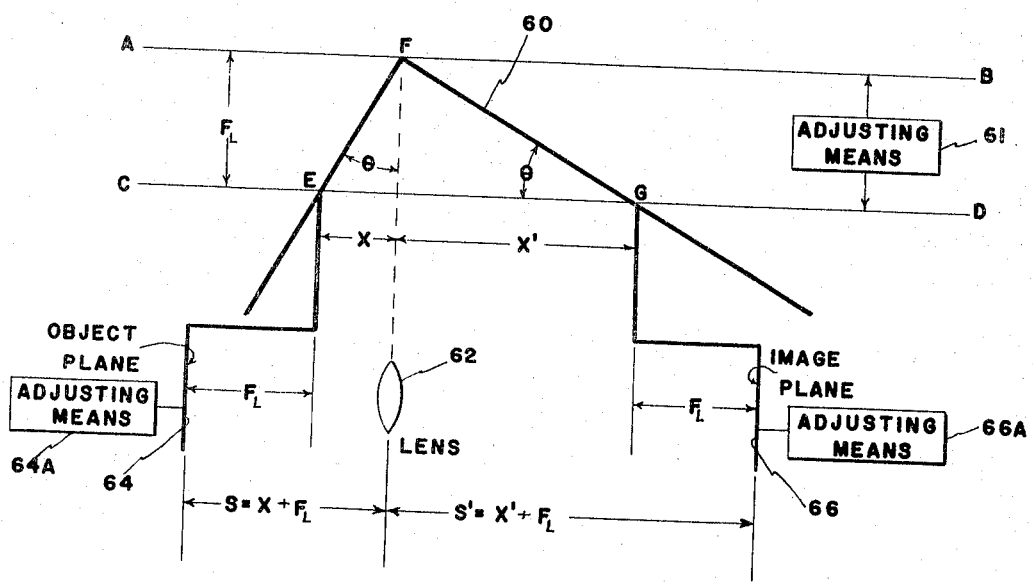

For a better understanding of the invention reference should be had to the accompanying drawings wherein:

FIGURE 1 is a diagrammatic view of a basic linkage mechanism for automatic focusing of an optical system; and FIGURE 2 is a diagrammatic view of the linkage mechanism of FIGURE 1 illustrating the mathematical relationship of the image plane and object plane relative to the right angle linkage.

With reference to the form of the invention illustrated in the drawings, FIGURE 1 shows the basc linkage mechanism for automatic focusing of a simple optical system, indicated generally by numeral 10. The system 10 includes a lens 12 positioned in a lens support 14. The lens support 14 is slidably mounted on guide rails 16 and 18 which extend parallel to the axis of the lens. A screen 20 extending in a plane normal to the axis of the lens also is slidably mounted on the guide rails 16 and 18. A film holder 22 positions a film 24 in alignment with the lens axis and in a plane normal thereto. Light passing through the film projects an image on the screen 20 which is focused by the lens 12.

The linkage mechanism comprises a bell crank 26 having a 90° included angle. An arm 28 of the bell crank has a longitudinally extending slot 30 and an arm 32 of the bell crank has a longitudinally extending slot 34. A pivot pin 36 extending in the plane of the lens and in a plane parallel to the axis of the lens pivotally secures the apex of the bell crank to the lens frame. The pivot plane of the crank 26 is substantially parallel to the axis of the lens, but offset therefrom a distance equal to the focal length ($F_L$) of the lens.

A second pivot pin 40 positioned in the plane of the lens and extending normal thereto engages the slot 30 of the arm 28 of the bell crank. The pivot pin is rigidly secured to the screen 20 by a link 42. The pivot pin 40 is spaced from the screen towards the lens a distance equal to the focal length ($F_L$) of the lens. The link 42 is slidably positioned in a support 44 for movement parallel to the axis of the lens. The link 42 is connected to the screen at 46 so that the screen and link moves as a unit.

A third pivot pin 48 engages the slot 34 of the arm 32 of the crank. Pivot pin 48 is positioned in the plane of the axis of the lens and extends normal thereto. The pivot pin 48 extends parallel to pivot pins 36 and 40. A support 50 positions the pivot pin 48 from the film 24 towards the lens 12 a distance equal to the focal length ($F_L$) of the lens.

The linkage functions to keep the image projected on the screen in focus when the size of the image thereon is changed. Movement of the lens along the guide rails 16 and 18 changes the distance between the lens and the film. The linkage moves the screen 20 along the axis of the lens relative to the plane of the lens and the plane of the film to keep the image projected on the screen in focus.

For a better understanding of the mathematical properties of this right angle autofocus linkage, reference should be had to a slightly modified schematic illustration in FIGURE 2 wherein a right triangular linkage 60 is shown as retained at point F on a longitudinal slide AB while retained at points E and G by a parallel longitudinal slide CD. AB and CD are spaced a distance, F, apart, where F is the focal length of a lens 62. Means 61 are provided to adjust the spaced relation of the parallel slides AB and CD. Points E, F, and G are retained vertically by the two slides, but are slidable in relation to the slides AB and CD. Object and impage planes 64 and 66, respectively, are located a distance equivalent to the focal length F away from points E and G, respectively, but positioned parallel thereto. Note that the lens 62 is positioned parallel to the object and image plane 64, the adjustability of the parallel slides AB and CD by means 61 to the focal length F of the lens 62 then allows automatic focus on the image plane 66 regardless of any movement of the right angular linkage 60. Therefore, it should be understood that if, for example, point E remains stationary along with the object plane 64, the points F and G will be slidable along their respective parallel slides with point E remaining stationary although the arm of the linkage extending thereover will be slidable because of a suitable slotted relationship, such as that shown in FIGURE 1.

It is also seen from FIGURE 2 that the linkage geometry will be as follows: $X'=f \cot \theta$ and $X=f \tan \theta$, so that the image and object distances S and S' from the lens becomes $S=f(1+\tan \theta)$ and $S'=f(1+\cot \theta)$. Substituting these values into the normal lens equation:

$$\frac{1}{f}=\frac{1}{f(1+\tan \theta)}+\frac{1}{f(1+\cot \theta)}$$

$$=\frac{1}{f}\left[\frac{1+\cot \theta+1+\tan \theta}{(1+\tan \theta)(1+\cot \theta)}\right]$$

which equals $$\frac{1}{f}\left[\frac{2+\tan \theta+\cot \theta}{2+\tan \theta+\cot \theta}\right]$$

which in effect equals $1/f$. Thus the identity is proved and the autolinkage is shown to satisfy the lens equation insuring focus when S and S' are varied. Adjusting means 64A and 66A are used to control the focal length between the image plane 66 and object plane 64 and the lens 62, respectively to adjust for a lens with a different focal length while still giving autofocus. Of course, the slides AB and CD will be appropriately adjusted by the means 61.

Therefore, it should be understood that an autofocus linkage using a right angular linkage bar as the main component will provide autofocus in a quick, efficient and highly accurate manner. Further, the fact that the parallel mounting bars for the linkage, may be changed in their spaced relationship, readily allows various lenses to be used in the combination, without destroying the autofocus properties. This property is inherent without changing the image and object planes.

While in accordance with the patent statutes only one best known embodiment of the invention has been illustrated and described in detail, it is to be understood that the invention is not limited thereto or thereby, but that the inventive scope is defined in the appended claims.

What is claimed is:

1. A automatic lens focusing linkage for an axially movable lens in parallel alignment with a fixed film and a movable screen so that light passing through the film and lens projects an image on the screen comprising
    a bell crank having a 90° included angle and a longitudinal open slot at each end thereof,
    means pivotally connecting the apex of the bell crank to the lens,
        said pivot means extending in the plane of the lens and in a plane parallel to the axis of the lens offset a distance equal to the focal length of the lens,
    means to selectively adjust the spaced relation between the pivot means and the lens to allow use of lenses with various focal lengths,
    means limiting the movement of the pivot means to the plane parallel to the axis of the lens,
    a fixed guide pin spaced from the film toward the lens a distance equal to the focal length of the lens, said fixed pin being positioned in the plane of the axis of the lens and extending normal to said axis and parallel to said pivot means,
        one of said slotted open end portions of the crank being in engagement with the pin,
    a movable guide pin spaced from the screen toward the lens a distance equal to the focal length of the lens, said pin being positioned in the plane of the axis of the lens and extending normal to said axis and parallel to said pivot means,
        the other of said slotted open end portions of the crank being in engagement with the movable pin,
    a link securing the movable guide pin to the screen, and
    means limiting the movement of the movable guide pin to the plane of the axis of the lens.

2. The automatic lens focusing linkage for an axially movable lens in parallel alignment with a film in fixed relation and a movable screen so that light passing through the film and lens projects an image on the screen comprising
    a bell crank having a 90° included angle and a longitudinal open slot at each end thereof,
    means pivotally connecting the apex of the bell crank to the lens at a point offset from the axis of the lens a distance equal to the focal length of the lens,
    means to selectively adjust the spaced relation of the apex of the bell crank to the lens,
    means limiting the movement of the pivot means to the plane parallel to the axis of the lens,
    a fixed guide pin spaced from the film toward the lens a distance equal to the focal length of the lens, said fixed pin being positioned in the plane of the axis of the lens and extending normal to said axis and parallel to said pivot means,
        one of said slotted open end portions of the crank being in engagement with the pin,
    a movable guide pin spaced from the screen toward the lens a distance equal to the focal length of the lens, said pin being positioned in the plane of the axis of the lens and extending normal to said axis and parallel to said pivot means,
        the other of said slotted open end portions of the crank being in engagement with the movable pin, and
    means limiting the movement of the movable guide pin to the plane of the axis of the lens.

References Cited by the Examiner

UNITED STATES PATENTS

| | | | |
|---|---|---|---|
| 1,138,217 | 5/1915 | Holst | 88—24 |
| 1,190,214 | 7/1916 | Becker | 88—24 |
| 1,399,347 | 12/1921 | Jobke | 88—24 |
| 2,243,084 | 5/1941 | Browne | 88—24 |
| 3,217,593 | 11/1965 | Seizinger | 88—24 |

JULIA E. COINER, *Primary Examiner.*